United States Patent [19]

Kobayashi

[11] Patent Number: 4,496,891
[45] Date of Patent: Jan. 29, 1985

[54] STEPPING MOTOR CONTROL APPARATUS

[75] Inventor: Makoto Kobayashi, Chiba, Japan

[73] Assignee: Canon Kabushiki Kaisha, Tokyo, Japan

[21] Appl. No.: 517,460

[22] Filed: Jul. 26, 1983

[30] Foreign Application Priority Data

Aug. 5, 1982 [JP] Japan ................................. 57/135753

[51] Int. Cl.³ ............................................. H02K 29/04
[52] U.S. Cl. ..................................... 318/696; 318/685
[58] Field of Search ......................... 318/696, 685, 416

[56] References Cited

U.S. PATENT DOCUMENTS 4,333,045 6/1982 Oltendorf ............................ 318/696

OTHER PUBLICATIONS

IBM Technical Disclosure Bulletin, vol. 17, No. 11, Apr. 1975, G. P. Check et al., "Programmable Stepper Motor Control".

Primary Examiner—J. V. Truhe
Assistant Examiner—Saul M. Bergmann
Attorney, Agent, or Firm—Fitzpatrick, Cella, Harper & Scinto

[57] ABSTRACT

A frequency of a power supply applied to a stepping motor changes in accordance with a predetermined program to control the stepping motor such that a predetermined rotational speed of the motor is quickly obtained without generating noise. The power supply frequency is abruptly and linearly increased or decreased within an initial predetermined time interval. A high accelerating or decelerating torque is applied to the stepping motor to obtain a first rotational speed for a short period of time. Thereafter, the power supply frequency is exponentially decreased or increased within a final predetermined time interval to obtain a second rotational speed at which the noise level is low.

7 Claims, 8 Drawing Figures

STEPPING MOTOR CONTROL APPARATUS

BACKGROUND OF THE INVENTION

1. Field of the Invention

The present invention relates to a stepping motor control apparatus employing a control method for controlling the acceleration and deceleration of a stepping motor in accordance with a predetermined program.

2. Description of the Prior Art

Conventionally, a driving pulse train is set to have a frequency higher than a self-start frequency of a stepping motor so as to drive the stepping motor at a high speed in a manner to be described with reference to FIGS. 1 and 2.

FIG. 1 is a graph showing the torque of the stepping motor as a function of the driving frequency when a high-speed driving device is used. Referring to FIG. 1, dotted line $L_1$ denotes a self-start frequency characteristic curve in the stepping motor; and $L_2$, a continuous response characteristic curve.

FIG. 2 is a graph showing the driving frequency as a function of time elapsed (required) for acceleration. In acceleration control in FIG. 2, since the acceleration is kept constant, it is considered that the accelerating torque is also kept constant.

Referring again to FIG. 1, if a frequency lower than (plotted to the left of) a maximum continuous response frequency $F_2$ plotted on the continuous response characteristic curve $L_2$ is given as a target frequency $f_2$, the accelerating torque must be smaller (e.g., Tb) than a motor output torque Ta at point $P_2$ on the continuous response characteristic curve $L_2$. The driving frequency is increased from a frequency lower than that corresponding to the stepping motor output torque Ta in the self-start frequency characteristic curve $L_1$ to the target frequency $f_2$ at a constant acceleration torque Tb.

However, as may be apparent from the curves $L_1$ and $L_2$ in the graph shown in FIG. 1, when the stepping motor is self-started, the output torque characteristic curve coincides with the curve $L_2$, thereby forming a driving frequency interval wherein a torque is greater than the accelerating torque Tb by an amount Tc. As a result, it is found that the accelerating torque cannot be effectively utilized.

For this reason, it takes a long time to increase the driving frequency of the stepping motor to the target frequency, resulting in inconvenience. Furthermore, when gears are used in a power transmission system, noise due to back lash of the gears is caused by the excessive torque Tc.

SUMMARY OF THE INVENTION

It is a first object of the present invention to properly control acceleration and deceleration of a stepping motor.

It is a second object of the present invention to smoothly perform acceleration and deceleration to obtain a predetermined rotational frequency of the stepping motor within a short period of time.

It is a third object of the present invention to reduce noise caused upon driving of the stepping motor.

DETAILED DESCRIPTION OF THE PREFERRED EMBODIMENT

The principle of control operation of the present invention will be described with reference to FIG. 3.

Figure 1:
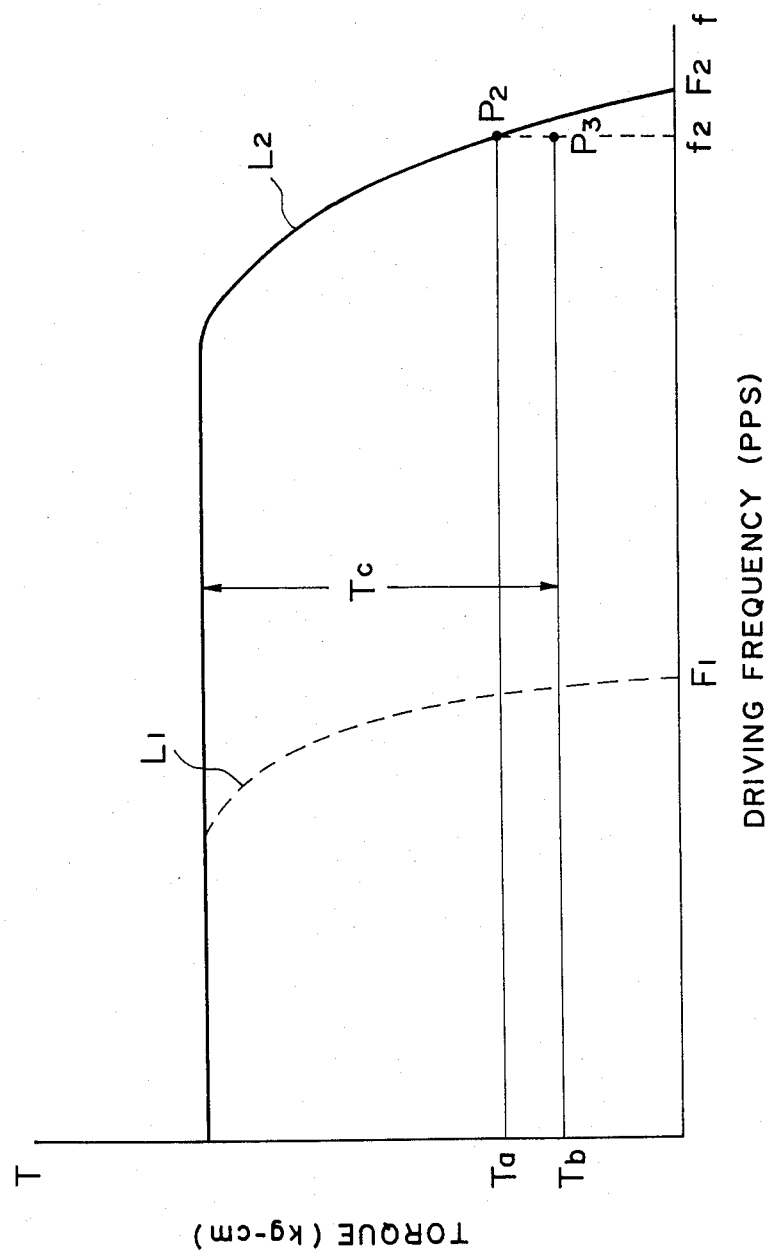
FIG. 1 is a graph for explaining the principle of control of a conventional stepping motor.
Figure 2:
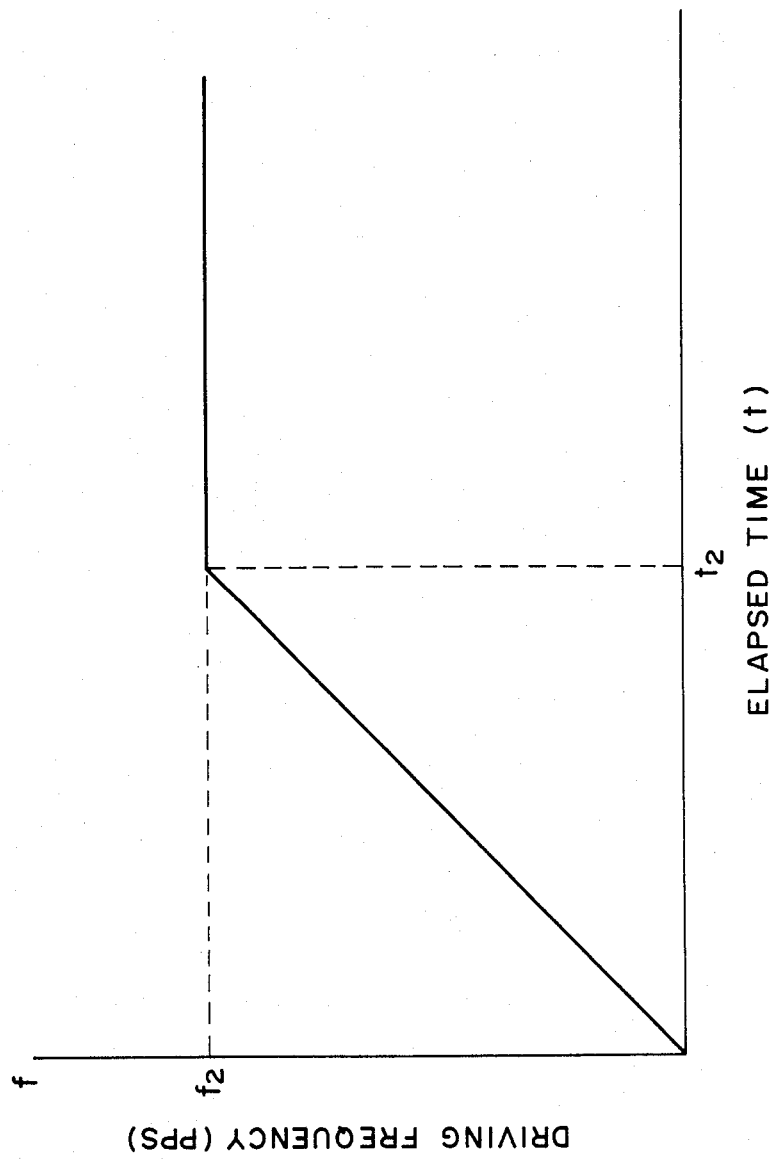
FIG. 2 is a graph for explaining an example of conventional acceleration control.
Figure 3:
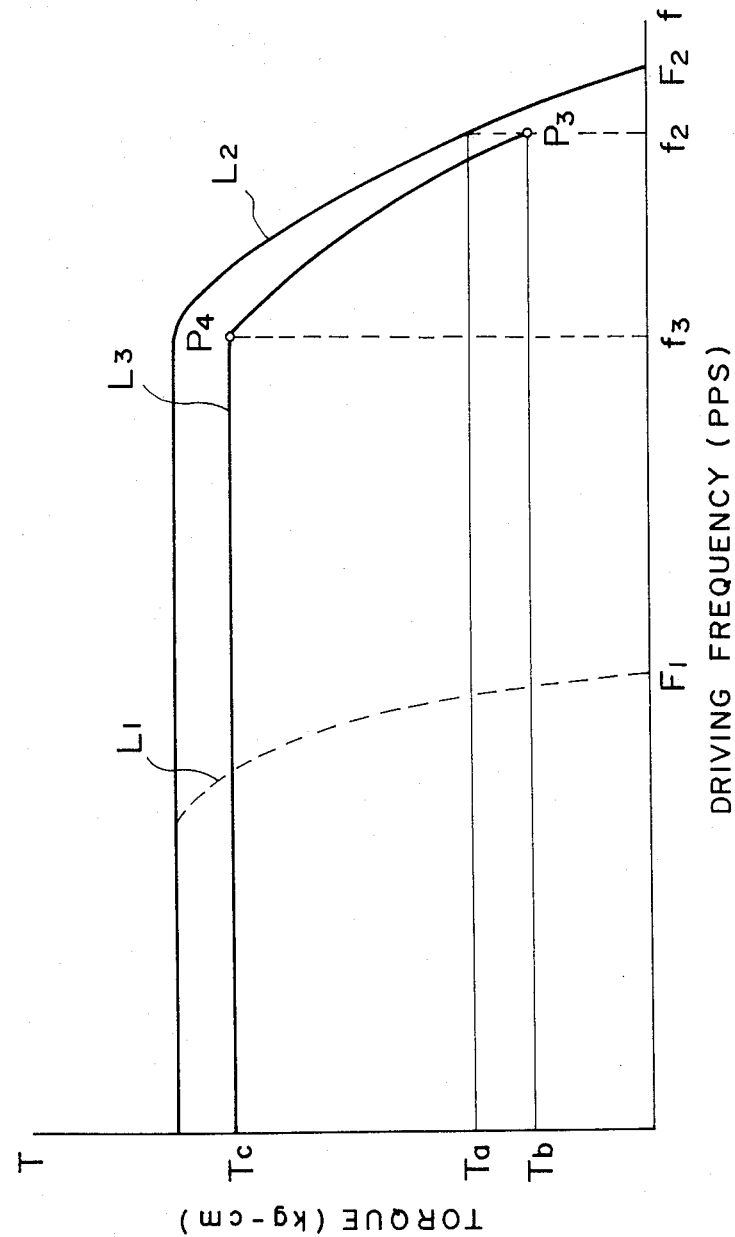
FIG. 3 is a graph for explaining the principle of control according to the present invention.

FIG. 3 is a graph obtained by adding an accelerating torque characteristic curve $L_3$ of the stepping motor of the present invention to the relationship between a driving frequency of the stepping motor and its torque as shown in the conventional stepping motor in FIG. 1.

When a general high-speed driving device is used, the continuous response characteristic curve and the self-start frequency characteristic curve indicate a predetermined output torque until a predetermined driving frequency is attained. However, in a driving frequency range having a frequency higher than the predetermined driving frequency, the output torque tends to exponentially decrease.

The stepping motor of the present invention is controlled in accordance with the curve $L_3$. The motor is self-started at a driving frequency range where the self-start frequency characteristic curve $L_1$ of the motor indicates a substantially constant value which is higher than the torque Ta. The torque imposed on the stepping motor at the self start of the motor is somewhat lower than the constant value, namely Tc or more. Then, the torque Tc higher than Tb is imposed on the motor until the driving frequency is increased up to about a frequency where the continuous response characteristic curve $L_2$ begins to exponentially fall, namely $f_3$. In a frequency range from $f_3$ to the target frequency $f_2$, the acceleration torque is decreased from Tc to Tb in accordance with the curve $L_3$.

Figure 4:
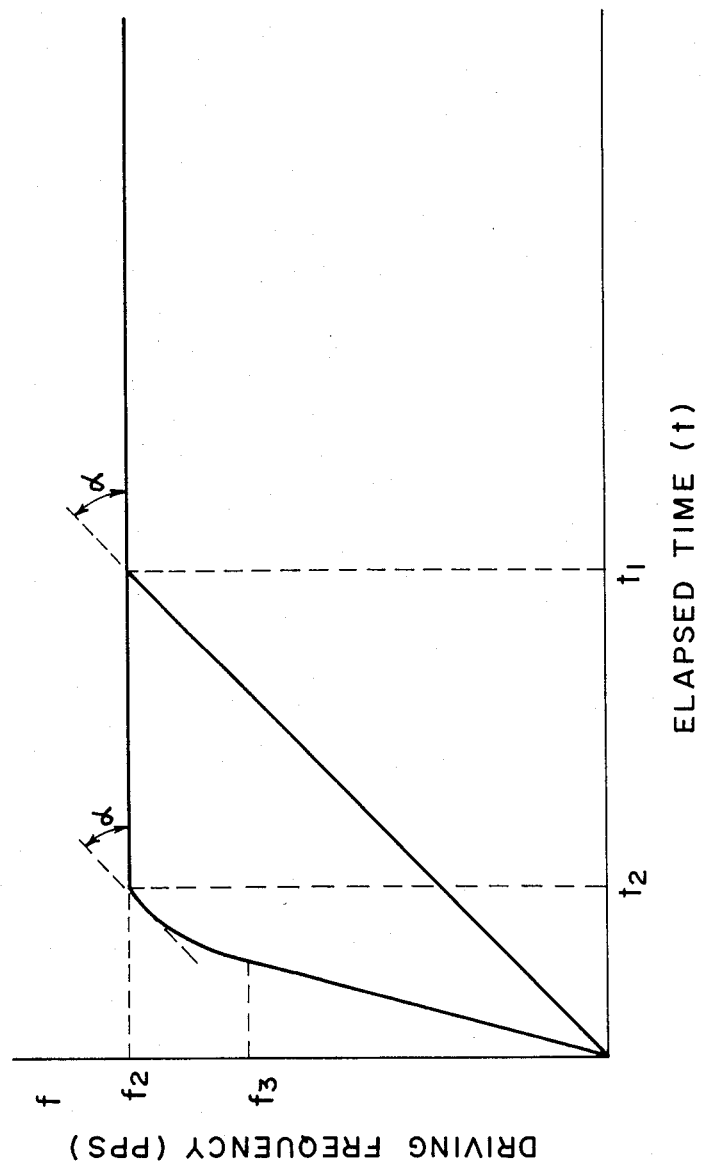
FIG. 4 is a graph for explaining acceleration control according to the present invention.

FIG. 4 is a graph for comparing the conventional acceleration control with the relationship between the driving frequency and the time required (elapsed) for acceleration in accordance with the accelerating torque characteristic curve of the present invention. Referring to FIG. 4, acceleration control is performed until the driving frequency $f_3$ is attained, in accordance with the acceleration determined by a constant accelerating torque Tc. The stepping motor is accelerated by an exponential approximation at an acceleration (the gradient of the driving frequency as a function of elapsed time t at time $t_2$ is $\alpha$) in the range between the driving frequency $f_3$ and the target frequency $f_2$, such that the stepping motor provides an output torque (e.g., Tb) lower than the output torque Ta.

According to the present invention, the accelerating (or decelerating) torque is increased while the output torque of the stepping motor plotted on the continuous response curve is high. However, in the driving frequency range wherein the output torque is decreased, the accelerating (decelerating) torque is exponentially decreased. As a result, a stepping motor control system of the present invention has the advantages that the output torque of the stepping motor can be effectively used, that time required for accelerating (decelerating) the stepping motor to the target frequency can be shortened, and that noise from the power transmission system can be decreased.

Figure 5:
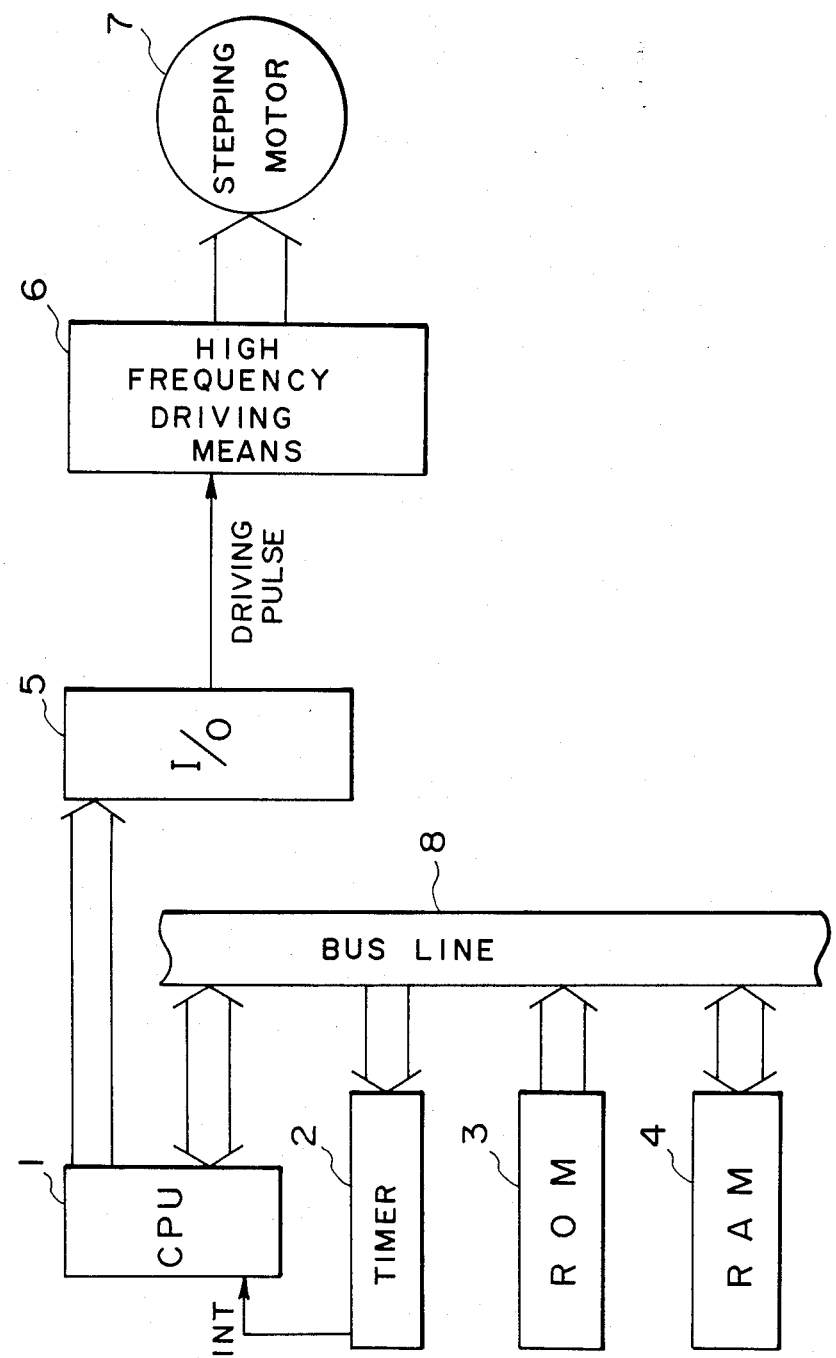
FIG. 5 is a block diagram of a stepping motor control apparatus according to an embodiment of the present invention.

FIG. 5 shows a stepping motor control apparatus according to an embodiment of the present invention.

A central processing unit (CPU) 1 is connected to an I/O interface 5. The CPU 1 is also connected to a timer 2, a read-only memory (ROM) 3, and a random access memory (RAM) 4 through bus line 8. The I/O interface 5 is connected to a high frequency driving means 6. The high frequency driving means 6 is then connected to a stepping motor 7.

Figure 6:
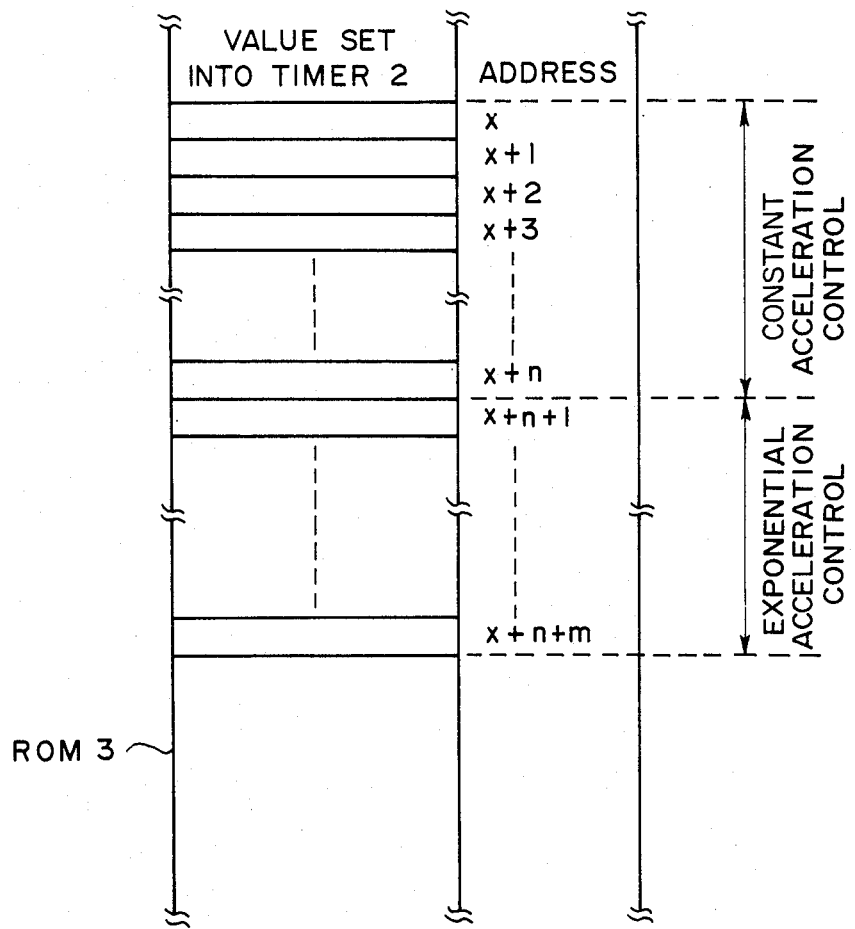
FIG. 6 shows a data format of a ROM of the apparatus shown in FIG. 5.

The driving frequency of the stepping motor 7 is preset to rotate the stepping motor 7 by one pulse. A time interval corresponding to the driving frequency of the acceleration control curve shown in FIG. 4 must be present in the ROM 3 shown in FIG. 6.

Figure 7:
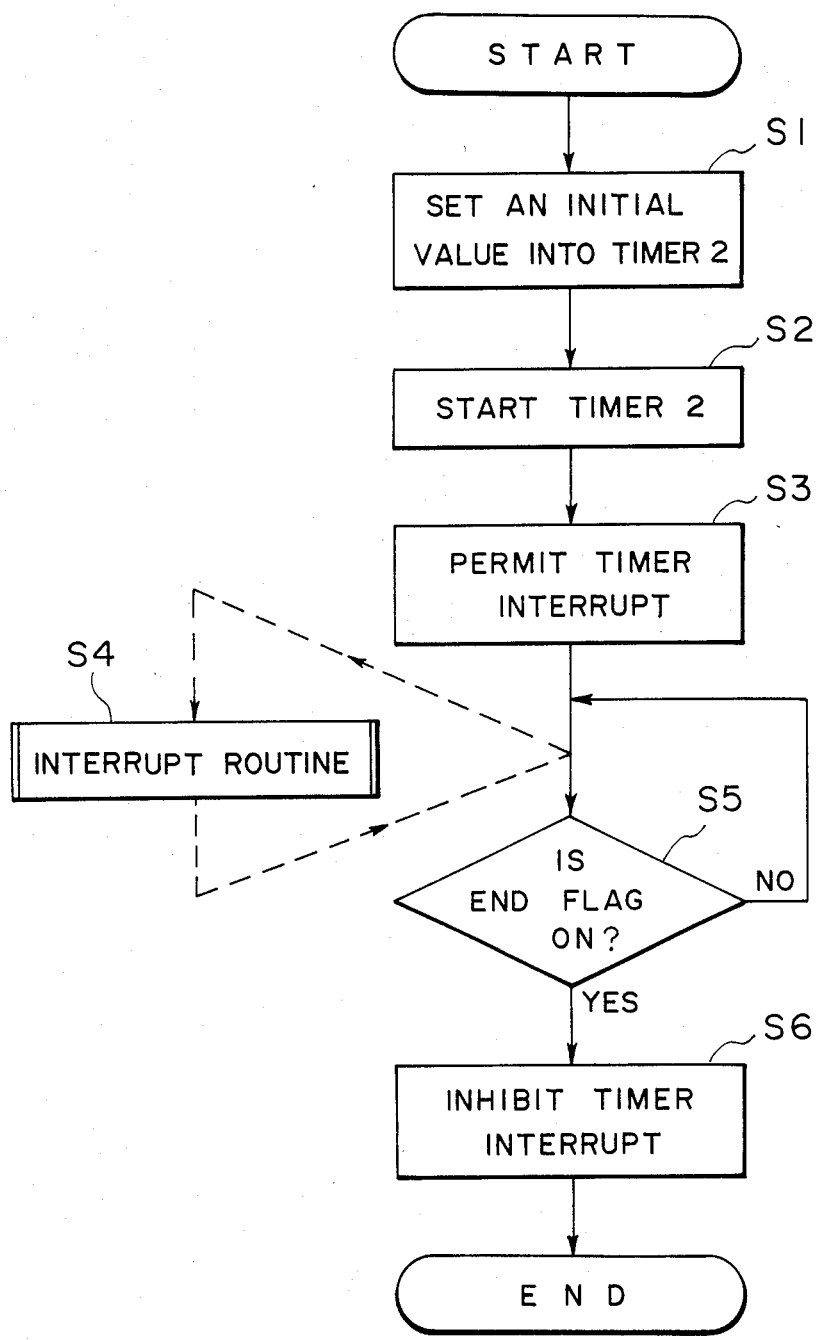
FIG. 7 is a flow chart for explaining a main routine of the apparatus shown in FIG. 5.

The CPU 1 is operated to execute the main routine of the flow chart in FIG. 7 when the stepping motor is started. In step S1, count data at an address x is read out as a time interval of the driving pulses from an acceleration control table (FIG. 6) of the ROM 3. The count data is set as an initial value in the timer 2. The timer 2 is started in step S2. The driving pulse time interval causes the CPU 1 to perform an interrupt operation in step S3.

Figure 8:
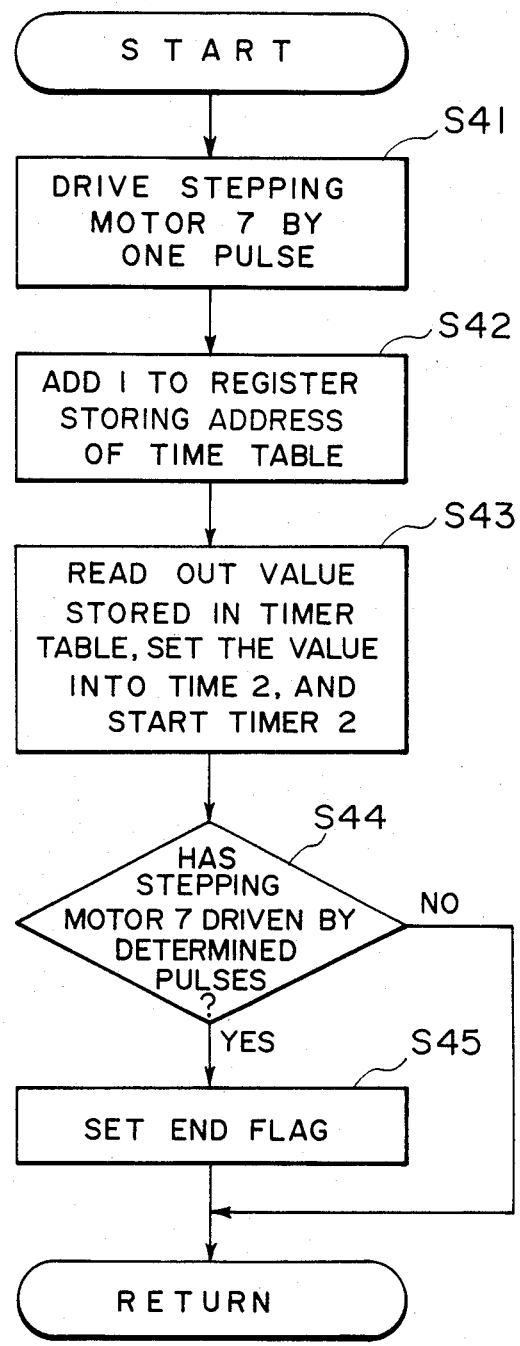
FIG. 8 is a flow chart for explaining an interrupt routine of the apparatus shown in FIG. 5.

This interrupt operation causes the CPU 1 to advance to interrupt routine S4 which is shown in the flow chart in FIG. 8. In step S41, a driving pulse is generated through the I/O interface 5 and is supplied to the stepping motor 7 which is then rotated by one pulse.

In step S42, the content of the register which indicates the address of the acceleration control timer table is increased or incremented by one. In step S43, the count data at this address is set in the timer 2, and the timer 2 is started. The driving pulse causes the high frequency driving means to drive the stepping motor 7 by one step.

In step S44, the above-mentioned operation is repeated until a predetermined number of pulses have been supplied to the stepping motor 7. Constant acceleration control continues until the address of the memory table reaches $x+n$. Exponential acceleration control is then performed between addresses $x+n+1$ and $x+n+m$. When it is determined in step S44 that the predetermined number of pulses have been supplied to the stepping motor (if YES in step S44), an end flag is set in step S45, and the flow returns to the main routine in FIG. 7.

In step S5 of the main routine, after it is checked that the end flag is set, the flow advances to step S6. In step S6, the timer interrupt operation is prohibited. As a result, the acceleration control of the motor 7 is ended.

The acceleration control of the stepping motor 7 has been described. The reverse control will be performed when high-frequency driving of the stepping motor 7 changes to low-frequency driving or stopping of the stepping motor. In this case, the motor output torque is exponentially decreased in the range between the high frequency and the frequency corresponding to the start of the exponential decrease in the output torque. The motor output torque is decreased in the range of frequency below the frequency corresponding to the start of the exponential decrease in the output torque. Therefore, it is expected that noise be decreased upon deceleration of the stepping motor, for the same reason as in acceleration thereof.

According to the present invention, when the stepping motor is accelerated or decelerated in the manner described above, the acceleration or deceleration control thereof can be performed in a short period of time. Furthermore, noise from the power transmission system upon acceleration or deceleration of the stepping motor can be reduced.

What I claim is:

1. A stepping motor control apparatus comprising:
    memory means for storing control steps of a stepping motor;
    time counting means for counting a plurality of time intervals; and
    controlling means for generating a power supply frequency to apply a substantially constant acceleration or deceleration torque to the stepping motor within a first interval counted by said time counting means in accordance with the control steps stored in said memory means, and for generating another power supply frequency to apply an acceleration or deceleration torque which changes as a function of time to the stepping motor within a second time interval counted by said time counting means in accordance with the control steps stored in said memory means.

2. An apparatus according to claim 1, wherein said controlling means performs constant acceleration or deceleration control such that a rotational frequency of the stepping motor is linearly increased or decreased within the first time interval, and exponential acceleration or deceleration control such that the rotational frequency of the stepping motor is exponentially increased or decreased within the second time interval.

3. An apparatus according to claim 1, wherein said controlling means performs constant acceleration or deceleration control such that a frequency of an input pulse supplied to the stepping motor is linearly increased or decreased within the first time interval, and exponential acceleration or deceleration control such that the frequency of the input pulse supplied to the stepping motor is exponentially increased or decreased within the second time interval.

4. An apparatus according to claim 1, wherein said controlling means performs linear control such that said substantially constant acceleration or deceleration torque is linearly increased or decreased as a function of time within the first time interval, and exponential control such that said acceleration or deceleration torque which changes as a function of time is exponentially increased or decreased as a function of time within the second time interval.

5. An apparatus according to claim 1, wherein said controlling means performs linear control such that the output torque of the stepping motor is substantially constant within the first time interval, and wherein said controlling means performs exponential control such that the output torque of the stepping motor changes substantially exponentially as a function of time within the second time interval.

6. A stepping motor control apparatus comprising:
    memory means for storing control steps of a stepping motor;
    time counting means for counting a plurality of time intervals; and controlling means for controlling the stepping motor such that a high acceleration or deceleration torque of the stepping motor is set during an initial predetermined time interval counted by said time counting means, and that a low acceleration or deceleration torque of the stepping motor is set during a final predetermined time interval counted by said time counting means.

7. An apparatus according to claim 6, wherein said controlling means produces a gradual decrease in the accelerating or decelerating torque of the stepping motor during the final during the final predetermined time interval.

* * * * *

UNITED STATES PATENT AND TRADEMARK OFFICE
CERTIFICATE OF CORRECTION

PATENT NO. : 4,496,891
DATED : January 29, 1985
INVENTOR(S) : Makoto Kobayashi

It is certified that error appears in the above-identified patent and that said Letters Patent is hereby corrected as shown below:

Column 6, line 6, delete "during the final" (second occurrence).

Signed and Sealed this

Eleventh Day of June 1985

[SEAL]

Attest:

DONALD J. QUIGG

*Attesting Officer*  *Acting Commissioner of Patents and Trademarks*